United States Patent [19]
Gutbier

[11] 3,992,223
[45] *Nov. 16, 1976

[54] METHOD AND APPARATUS FOR REMOVING REACTION WATER FROM FUEL CELLS

[75] Inventor: Heinrich Gutbier, Erlangen, Germany

[73] Assignee: Siemens Aktiengesellschaft, Munich, Berlin, Germany

[ * ] Notice: The portion of the term of this patent subsequent to Dec. 21, 1988, has been disclaimed.

[22] Filed: July 18, 1973

[21] Appl. No.: 380,162

Related U.S. Application Data

[63] Continuation of Ser. No. 95,924, Dec. 7, 1970, abandoned, which is a continuation of Ser. No. 694,252, Dec. 28, 1967, abandoned.

[30] Foreign Application Priority Data

Jan. 4, 1967  Germany............................ 107724V
Mar. 4, 1967  Germany............................ 108649

[52] U.S. Cl. .................................................. 429/14
[51] Int. Cl.² ......................................... H01M 8/04
[58] Field of Search ........................ 136/86 C, 86 R

[56] References Cited
UNITED STATES PATENTS

| | | | |
|---|---|---|---|
| 3,132,973 | 5/1964 | Duddy............................. | 136/86 R |
| 3,370,984 | 2/1968 | Platner............................ | 136/86 R |
| 3,484,294 | 12/1969 | Fischer et al. .................... | 136/86 R |
| 3,492,163 | 1/1970 | Hilmer............................. | 136/86 C |
| 3,629,075 | 12/1971 | Gutbier............................ | 136/86 C |

*Primary Examiner*—T. Tung
*Assistant Examiner*—H. A. Feeley
*Attorney, Agent, or Firm*—Herbert L. Lerner

[57] ABSTRACT

Method of removing reaction water from a fuel cell includes bringing electrolyte of the fuel cell in contact with a diaphragm having a given capillary depression pressure and permeable to water vapor so that water vapor contained in the electrolyte diffuses through the diaphragm into a chamber containing a gas at a given pressure, and passing the diffused water vapor to a location at which it engages with a cooled condensation surface and condenses thereon, the electrolyte having a hydrostatic pressure equilibrated by at least one of the pressures exerted by the gas and the capillary depression in the diaphragm. Apparatus for carrying out the foregoing method includes a gas chamber, a chamber for electrolyte, means separating said chambers from one another comprising a diaphragm permeable to water vapor contained in the electrolyte, a condensation surface located in the gas chamber for condensing water vapor coming in contact therewith, and means connected to the gas chamber for discharging therefrom water condensed by the condensation surface.

17 Claims, 5 Drawing Figures

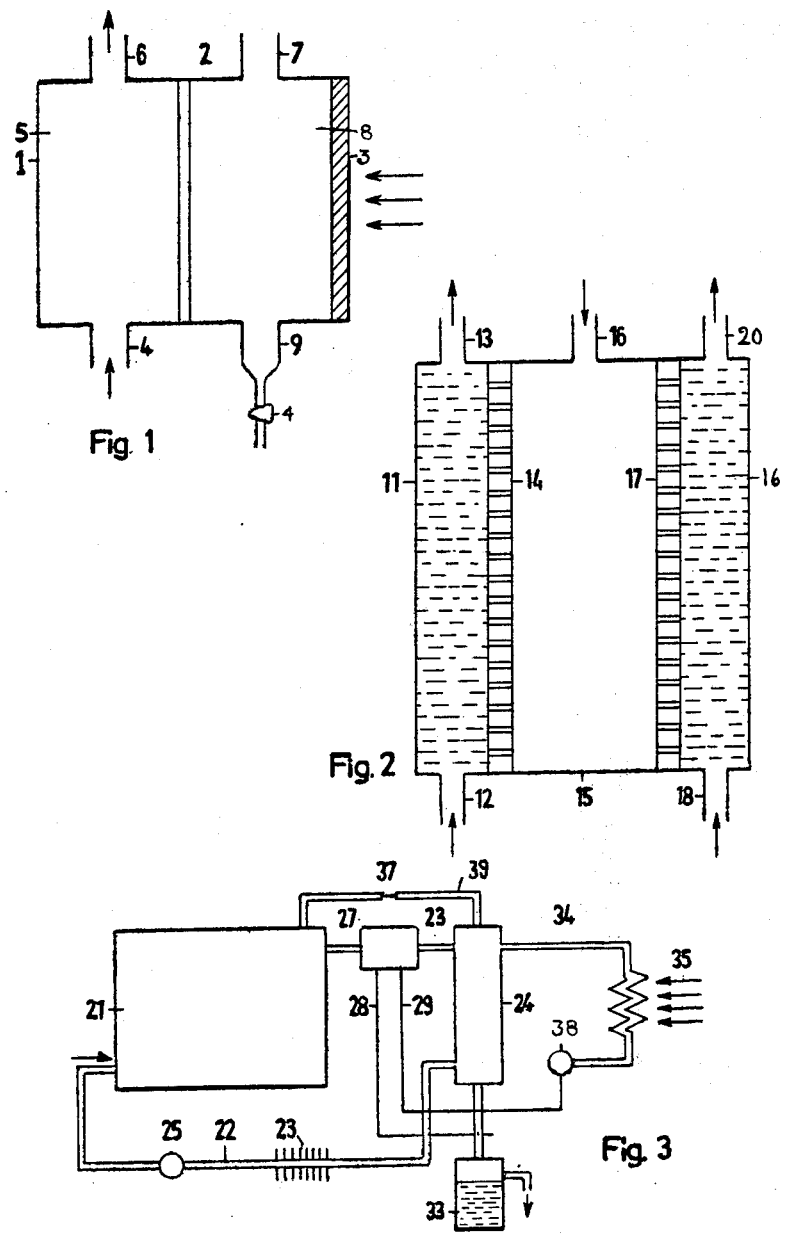

METHOD AND APPARATUS FOR REMOVING REACTION WATER FROM FUEL CELLS

This is a continuation of application Ser. No. 95,924, filed Dec. 7, 1970, now abandoned, which is a continuation of Ser. No. 694,252, now abandoned, filed Dec. 28, 1967.

My invention relates to method and apparatus for removing reaction water from fuel cells.

Many methods are already known for removing the reaction water from the electrolytes of fuel cells. In most cases, separation is effected by vaporization of the water and subsequent condensation of the water vapor. In accordance with these heretofore known methods, the vaporized water is entrained by one of the reactant gases circulating through the fuel cell system, is carried thereby outside of the fuel cell and condensed in a condenser.

A disadvantage of the foregoing heretofore known method is that water vapor saturation of the reactant gas is not achieved. Accordingly, the required gas throughput or flow-through rate, as well as the expenditure of energy, are greatly increased. Since, furthermore, there is an upper limit to the quantity of water dischargeable through the electrode structure in fuel cells, it is also impossible to remove reaction water formed at high current densities by increasing the gas flow-through rates. For heavily loaded fuel cells, additional measures or steps must be taken to maintain a constant concentration of the electrolyte.

In order to obtain improved efficiency, it has been proposed in French Pat. No. 1,463,299 that water vapor saturation of the reaction gas be effected outside of the fuel cell. The electrolyte, heated by the waste heat of the fuel cell and circulated in the loop of the fuel cell system, is initially conducted into a concentrator wherein the water formed during the reaction in the fuel cell is entrained in water vapor state by a carrier gas, and is thereafter returned through a cooler to the electrolyte chamber of the fuel cell. The gas flow laden with water vapor can be reconducted directly into the concentrator after giving up the water vapor in a water separator, or can be conducted to the electrodes of the fuel cell.

An advantage of this last-mentioned known method is that an auxiliary gas loop or circuit can be employed for separating the hydrogen of the electrolyte. Thereby, maintenance of a constant concentration of the electrolyte can be assured in a very simple manner even for varied loading of the fuel cell.

I have discovered, in accordance with the present invention, that the method heretofore employed for removing the reaction water from the fuel element can be considerably improved with regard to the reliability of the operation thereof and with regard to the expenditure of energy in the operation thereof.

It is accordingly, therefore, an object of my invention to provide method and apparatus for separating reaction water from reactant gas in fuel cells which does, in fact, improve the reliability of operation and reduce the energy expenditure in the operation of the fuel cell.

With the foregoing and other objects in view, I provide in accordance with my invention, method for separating reaction water from electrolyte in a fuel cell which comprises bringing the electrolyte of the fuel cell in contact with a diaphragm permeable to water vapor so that water vapor contained in the electrolyte diffuses through the diaphragm, passing the diffused water vapor to a location in which it engages with a cooled condensation surface and condenses thereon, the electrolyte having a hydrostatic pressure compensated or equilibrated either by gas pressure or capillary depression pressure in the diaphragm.

Further in accordance with the invention, this water-separation method can be carried out either inside or outside the fuel cell proper.

In its simplest embodiment, apparatus for carrying out the method of the invention comprises a flow-through chamber for electrolyte having a defining surface formed at least partly by a water vapor-permeable diaphragm separating the flow-through chamber of the electrolyte from a gas chamber, a cooled nonporous condensation surface located in the gas chamber for separating out water vapor coming in contact therewith, and means connected with the gas chamber for removing water condensed on the condensation surface from the gas chamber.

In accordance with further features of the invention, the diaphragm consists of any porous member resistant to or nonreactive with the electrolyte, such as nylon filter and asbestos paper, for example. Porous blocks or masses of ceramic material and sintered glass or metal are also suitable, however, for the diaphragm.

If the compensation of the hydrostatic pressure of the electrolyte is to be effected by means of the capillary depression pressure in the diaphragm, the diaphragm must consist of a hydrophobic material or of a material which is rendered water-repellent by applying hydrophobic layers or coatings thereto, for example layers or coatings of paraffin or plastic materials. In order to obtain the highest possible rate of vaporization, diaphragms having a high degree of porosity are advantageously employed. Small pore diameters ensure a relatively large flow resistance and thereby an apparent reduction in the water vapor partial pressure at the surface of the diaphragm. For this reason, the largest possible pore diameter is selected. However, since a trouble-free separation between liquid and gaseous phases in the diaphragm must be ensured, the size of the pore radius has an upper limit.

The removal of condensation water from the gas chamber can be effected either discontinuously or continuously. In continuous operation, the water is initially collected and, after a predetermined water level has been reached, is removed by means of a suitably controlled magnetic valve. It has been found to be particularly suitable for this purpose to employ a valve consisting of a porous plate for automatically and continuously removing water from the closed systems, as described and illustrated in application Ser. No. 468,079 of P. Jager, filed June 29, 1965, now U.S. Pat. No. 3,479,224 and assigned to the assignee of the instant application.

In accordance with a particularly advantageous embodiment of the invention of this application, there is provided a condensation surface cooled by a liquid for separating or condensing the water vapor diffusing from the electrolyte through the diaphragm, the condensation surface being formed entirely or partly of a porous material, in the pores of which the pressure of the water vapor-bearing gas is compensated or equilibrated by the capillary pressure in the porous material and the hydrostatic pressure of the cooling liquid. The water vaporized from the electrolyte and diffusing through the diaphragm thereby condenses on the condensation surface and is forced directly through the pores of the coolant surface into the coolant liquid. A special device for valving or sluicing the condensate water from the gas chamber is consequently not required.

In accordance with further features of the invention, material having good heat conductivity is advantageously employed as the porous material for the condensation surface and consists of sintered carbonyl-nickel, for example. However, materials having a relatively low heat conductivity may also be suitable for use as the porous material. Porous nickel foil, for example, has proven to be particularly well suited for condensation surfaces according to the invention.

Due to the combination of condensation surface and water valve or sluice, various advantages are afforded by the method of the invention in the instant application. Since it is unnecessary to collect condensate water in the gas chamber, the spacing between the diaphragm and the condensation surface, for example can be made relatively smaller. Thereby, a considerably higher specific water separating rate is attainable. Moreover, the water separation is then virtually independent of the position of the water-removing cell.

Other features which are considered as characteristic for the invention are set forth in the appended claims.

Although the invention is illustrated and described herein as method and apparatus for separating reaction water from electrolyte in fuel cells, it is nevertheless not intended to be limited to the details shown, since various changes may be made therein without departing from the spirit of the invention and within the scope and range of equivalents of the claims.

The construction and method of operation of the invention, however, together with additional objects and advantages thereof will be best understood from the following description when read in connection with the accompanying drawings, in which:

FIGS. 1 and 2 are diagrammatic views of two embodiments of a water-separating cell constructed in accordance with the invention;

FIG. 3 is a diagrammatic view of a circulatory system including a battery of fuel cells connected with a water-separating cell according to FIG. 2;

Figure 4:
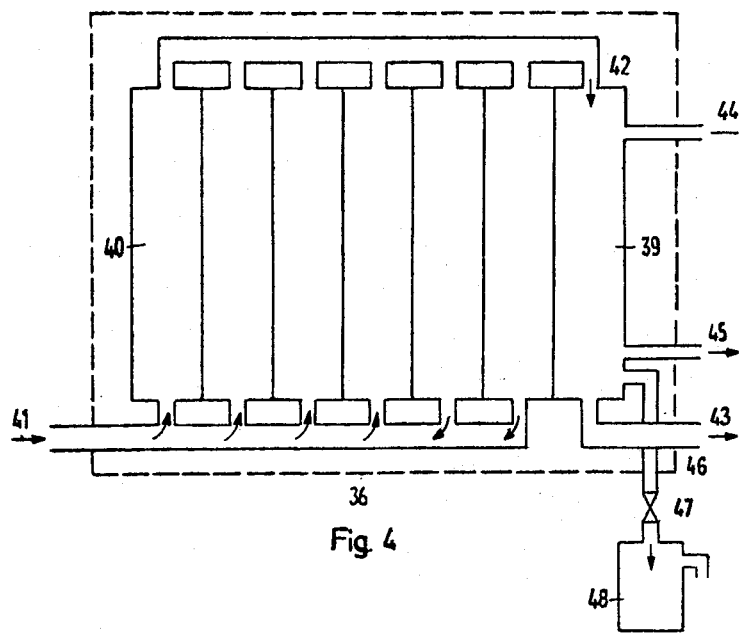
FIG. 4 is a diagrammatic view of a fuel cell battery incorporating a water-removing cell corresponding to the one shown in FIG. 2.

Referring now to the drawings and first particularly to FIG. 1 thereof, there is shown a housing 1 for a water-separating cell, a diaphragm 2 being disposed between the electrolyte chamber 5 and the gas chamber 8 thereof. A wall 3 providing a condensation surface is located at one side of the gas chamber 8 opposite to the diaphragm 2. Electrolyte flows through the duct 4 into the electrolyte chamber 5 and discharges therefrom through the duct 6. The gas chamber 8 is filled through the tube 7 with gas requiring liquid-gas phase separation, and consists of either hydrogen or oxygen for example. The removal of the condensation water which is formed is effected discontinuously or intermittently in the embodiment of FIG. 1 through a discharge tube 9 provided with a stopcock, and cooling of the condensation surface 3 is shown diagrammatically in FIG. 1 by the arrows 10 representing the blowing of cooling air thereon.

In FIG. 2 there is shown another embodiment of a water separating cell in which the condensation surface is porous. An electrolyte chamber 11 is provided into which the electrolyte flows through the duct 12 and out of which the electrolyte discharges through the duct 13. A wall of the electrolyte chamber 11 is formed by the diaphragm 14, which separates the electrolyte chamber 11 from a gas chamber 15, and through which the reaction water formed in the electrolyte diffuses into the gas chamber 15. An inert carrier gas such as hydrogen or nitrogen, for example, is supplied through the tube 16 to the gas chamber 15. A porous condensation surface 17 is located between the gas chamber 15 and a cooling chamber 18, condensate water located in the gas chamber 15 being forced through pores formed in the condensation surface 17 continually into the cooling liquid in the chamber 18 and discharged therefrom. Cooling liquid is supplied to the chamber 18 through the inlet duct 19 and is discharged therefrom through the discharge duct 20.

To determine the rate of condensation of the water vapor, a series of measurements or dimensions are given with relationship to the embodiment shown in FIG. 1. The diaphragm 2 is a 12.5 cm² filter of a 0.1 mm thickness, made either of nylon or of asbestos paper, built into a fuel-cell frame of conventional construction and, by means of a circular sealing ring of Perbunan or rubber or the like, gs-tightly pressed on a support frame containing the electrolyte. The electrolyte consists of 6 n KOH. The gas space 15 is gas-tightly closed by nickel plate, and the spacing between the diaphragm and the nickel plate is about 3 mm. By means of a semiconductor cooling block such as a Peltier block which is pressed onto the nickel plate serving as condensation surface, the condensation surface can be cooled from the outside to various temperatures. Hydrogen or oxygen are supplied as pressure gas into the gas chamber 15; however, other gases or gas mixtures can also be used for this purpose.

For an electrolyte temperature $T_1$ held constant at 60° C, the rate of condensation of water vapor is measured as a function of the temperature $T_2$ of the condensation surface. The measured values obtained thereby are given in the following Table I.

TABLE I

| Oxygen Nylon membrane 0.1 mm | $T_2[°C]$ | 1 | 3 | 7 | 11 | 19 | 35 | 43 |
|---|---|---|---|---|---|---|---|---|
| | $[g/cm^2 \cdot s]$ | 0.24 | 0.24 | 0.23 | 0.23 | 0.21 | 0.16 | 0.11 |
| Hydrogen Nylon membrane 0.1 mm | $T_2[°C]$ | 8 | 12 | 15 | 19 | 24 | 38 | 46 |
| | $[g/cm^2 \cdot s]$ | 0.50 | 0.50 | 0.55 | 0.46 | 0.43 | 0.30 | 0.17 |
| Hydrogen Asbestos membrane | $T_2[°C]$ | 15 (Normal | | | | 8 | (Very fine | |

TABLE I-continued

| 0.5 mm | [g/cm² · s] | 0.40 | asbestos) | 0.08 | asbestos) |

These data indicate that the rate of condensation changes very little with change in the temperature of the condensation surface, when the temperature of the condensation surface does not essentially exceed 20° C. On the other hand, the rate of condensation almost doubles when employing hydrogen as pressure gas rather than oxygen. As indicated by the condensation rates produced with normal and very fine asbestos, the porosity of the diaphragm greatly affects the vaporization process.

The vaporization rate $v$ of water molecules from 6 n KOH is able to be computed with the aid of the Stefan formula, which is $$v = \frac{D}{l} \frac{P}{RT} \ln \frac{P-P_2}{P-P_1}$$

wherein $D$ represents the diffusion constant in the respective gas, $l$ is the spacing between the vaporizing surface and the condensation surface, $P$ is the total gas pressure, $P_1$ is the water vapor pressure above the electrolyte at the temperature $T_1$, and $P_2$ is the water vapor pressure corresponding to the temperature $T_2$ of the condensation surface.

As a comparison, if the parametric values employed in the foregoing tests are inserted in the above-mentioned formula, then $T_1 = 60°$ C, $T_2 = 20°$ C, $P = 1.2$ atm, $l = 0.3$ cm, $RT = 2.5 \times 10^4$ cm³ atm/Mol, $D = 0.9 \times 10^3$ cm²/h in oxygen, $D = 3.1 \times 10^3$ cm²/h in hydrogen (D values for 40° C + 1.2 atm), $P_1 = 100$ Torr and $P_2 = 18$ Torr for 6 n KOH of the following evaporation rates:

$v = 0.24$ g/cm² . h in oxygen $v = 0.75$ g/cm² . h in hydrogen.

The agreement of the computed values with the measured values can be considered to be satisfactory throughout if one were to take into consideration the fact that for the diffusion constants and the temperatures in the gas chamber, only mean or average values have been employed.

If desired, the circulation of the water vapor in the apparatus of the invention can be increased even further by a mass convection produced by a thermally excited convection flow or by movement of the gas, the mass convection being adjustable within the gas chamber by specific arrangement and mounting of the diaphragm and the condensation plate or by adjustment of the flow.

By means of the vaporizing and condensation steps, on the one hand, and the heat conduction of the gas on the other hand, heat flow from the hot to the cold surface is produced. In the following Table II, the heat flows for a temperature difference of 40° C are given.

TABLE II

| Types of gas | Condensation rate (g/cm² · h) | Condensation heat (cal/cm² · s) | Heat conduction (cal/cm² · s) |
|---|---|---|---|
| Hydrogen | 0.48 | 0.08 | 0.06 |
| Oxygen | 0.24 | 0.04 | 0.009 |

In a fuel cell operated with hydrogen and oxygen, one mol of water is produced by a charge of 52 Ah (ampere-hours). Using a condensation rate of 0.4 g/cm².h of water as a basis for the computations, this rate corresponds to a current density of 1.15 A/cm² in the fuel cell. If one, furthermore, takes into account that, presently, fuel cells or explosive gas cells at 60° C are loaded at most with 80 mA/cm², the result thereof is that with 1 cm² of vaporizer surface or condensation surface, a quantity of water can be separated per second corresponding to a water production rate of 14 cm² of active fuel cell surface.

Figure 5:
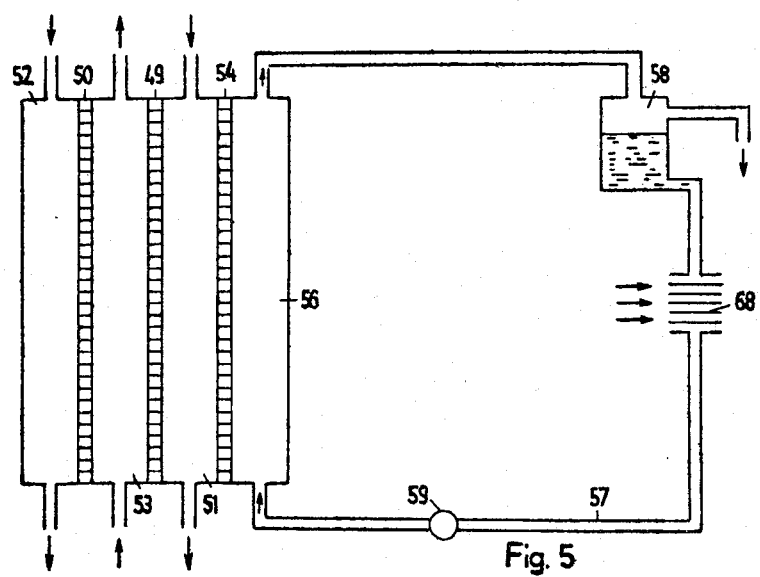
FIG. 5 is a diagrammatic view of a circulatory system including a modified form of the embodiment of a water-separating cell as shown in FIG. 2.

This desirable surface factor is accordingly employed with success for improving the heretofore known method of separating water from fuel cells. In FIGS. 3 to 5 there are shown diagrammatically various systems for carrying out such an improved water separating process.

In FIG. 3, there is shown a fuel cell battery 21 which is connected by the ducts 22 and 23 with a water separating cell 24 of the types shown in FIGS. 1 and 2. A pump 25 is located in the tube 22 for circulating the electrolyte through the cell 24, and a heat exchanger 26 is also connected in the tube 22. A concentration measuring device 27 of generally known construction is provided in the tube 23 and is connected by leads 28 and 29 with a valve 31 and a pump 30, respectively, for suitably adjusting the valve 31, which may be a conventional magnetic valve. Instead of the concentration measuring device 27, a suitable conventional device for measuring the level or quantity of electrolyte in the water-separating device may be employed for automatically regulating the valve 31. A water discharge tube 32 leads from the water separating cell 24 to a water collecting vessel 33. A pipe system 34 serves for circulating liquid required for cooling the water separating cell 24, when the latter is of the type shown in FIG. 2, the cooling being effected by flowing air represented by the arrows 35 onto diagrammatically illustrated cooling coils. If one of the reaction gases of the fuel cell is employed in the gas chamber of the water separating cell 24, the gas is supplied from the gas chamber 21 of the fuel cell battery to the water separating cell through a connecting tube 36 in which a protective valve 37 is suitably installed. The pressure in the gas chamber of the water separating cell 24 can accordingly be the same as the pressure in the gas chamber of the fuel elements 21 or can be reduced by means of a reducing valve.

In the embodiment of FIG. 4, there are shown six fuel cells 40 constructed according to the filter pressure principle assembled as a battery 38 and provided with a water separating cell 39 of substantially the same size as each of the fuel cells. The supply of electrolyte to the schematically shown fuel cells 40 of the battery 38 is effected respectively through the collector duct or manifold 41, and the discharge of electrolyte is effected through the manifold 42, the water separating cell 39 and the discharge duct 43. The water separating cell 39 of FIG. 4 can either be provided with a nonporous condensation surface according to FIG. 1 or with a porous condensation surface according to FIG. 2, either of the surfaces being cooled by any suitable means.

If the cell 39 corresponds to the embodiment of FIG. 2, coolant liquid is admitted through the duct 44, traverses the water separating cell 39, and discharges therefrom through the duct 45, the coolant liquid being advantageously passed therefrom into a coolant loop corresponding to the pipe system 34 of FIG. 3. To conduct the condensate water out of the water separating cell 39, a tube 46 with a valve 47 are provided, an overflow vessel 48 being connected thereto. If, in the system shown in FIG. 4, $n$ active, i.e. electrical energy-producing fuel cells of desired construction according to the filter pressure principle, are assembled as a battery and are provided with a water-separating cell of respectively equal size, the number $n$ is determined by the maximum current density $j$, with which the fuel cells are to be loaded over a relatively long period of time; it is ascertainable in a relatively simple manner from the condensation rate $d$ determined in the water-separating cell. In the aforementioned example, $j = 80$ mA/cm², i.e. one water-separating cell is employed for 28 active fuel cells. It is thereby assumed that with the water-separating cell shown in FIG. 4, both electrolyte surfaces are employed as vaporizing surfaces. In general, $n$ is determined by the equation $n = 5.8\ v/j$, wherein $v$ is given in g/cm².h, and $j$ is in A/cm². The just-described water-separation cell requires at most 5% of the battery volume, which can be considered as a desirable saving in space with respect to the heretofore indicated values therefor. Above all, additional energy for a gas circulating loop to remove water is unnecessary.

It is also noteworthy in this regard that for a fuel cell operated above 60° C, additional advantages can be obtained in that the water vapor partial pressure, and therewith also the vaporization rates, greatly increase with increasing temperature.

In the fuel cell, for a continuous load of 80 mA/cm², approximately half of the waste heat produced is dissipated as vaporizing heat. If hydrogen is employed as pressure gas in the water-separating cell of the invention, the heat transfer is particularly desirably developed due to the relatively good thermal conductivity of the hydrogen, so that in this manner virtually all of the waste heat can be given up to the coolant water or coolant gas. Regulation of the water separation from the electrolyte is advantageously effected by varying the condenser temperature, which can in turn be controlled through the coolant flow.

As aforementioned, the condensation method of my invention can also be carried out in the individual fuel cells proper. The only requirement is that in the fuel cell a suitable temperature gradient be maintained between the porous electrode and the condenser. The porous electrode thereby assumes either all or part of the function of the diaphragm, and the gas chamber located behind the electrode assumes the function of transporting the water vapor. The separation of the water vapor is achieved by cooling of the closure plate already located in the cell.

A system embodying the foregoing features is shown diagrammatically in FIG. 5. The fuel cell in the embodiment of FIG. 5 has a porous hydrogen electrode 49 and a porous oxygen electrode 50, each partly defining corresponding gas chambers 51 and 52. An electrolyte chamber 53 is located between the electrodes 49 and 50. The separation of reaction water takes place in accordance with my invention through the porous condensation surface 54 which, when using an alkali electrolyte, forms a defining wall of the hydrogen gas chamber, as shown in FIG. 4, and when using an acid electrolyte, advantageously forms a defining wall of the oxygen gas chamber. A cooling chamber 55 for condensing the reaction water vapor is connected through the pipes 56 and 57 with an overflow vessel 58. Liquid traversing the system 55–58 by means of a pump 59 located in the pipe 57 is cooled by any suitable air blowing means, by coolant liquid or by thermoelectric cooling block or Peltier block at the location 60.

The embodiment of the system shown in FIG. 5 is obviously not limited to a single fuel cell, since additional water-separating cells and fuel cells can readily be connected to the oxygen chamber 52 so as to advantageously combine several water-separating cells into a single coolant circulatory loop.

It is of course well within the scope of my invention to provide a temperature sensing device in the electrolyte circulatory system 21–26 of FIG. 3, which is connected to the pump 30 of the coolant circulatory system 34 of the water-separating device 24, to automatically regulate the flow of coolant in the cooling system in accordance with the temperature of the electrolyte. This could be used instead of the conventional electrolyte concentration measuring device 27 and its connecting lead 29 (FIG. 3) for controlling coolant flow or instead of the aforementioned non-illustrated conventional electrolyte volume indicating device.

I claim:

1. Process for the separation of reaction water and waste heat produced by reaction of gases in a fuel cell, which comprises discharging electrolyte containing reaction water and waste heat from the fuel cell and circulating the electrolyte to remove reaction water and waste heat and returning to the fuel cell by passing said electrolyte through an electrolyte chamber outside the fuel cell, said electrolyte chamber being connected to a water separation chamber with a porous diaphragm permeable to water vapor between the electrolyte chamber and the water separation chamber, passing said electrolyte in contact with the surface of the diaphragm in the electrolyte chamber producing a capillary compression permitting water vapor containing only a portion of said waste heat to diffuse through the diaphragm into said water separation chamber containing pressurized gas, equilibrating hydrostatic pressure of the electrolyte by at least one of the pressures exerted by the gas and the capillary compression in the diaphragm, conducting the water vapor containing only a portion of said waste heat diffused through the diaphragm in contact with a condensation surface continually cooled by a flow of fluid coolant to effect condensation of the water vapor on the condensation surface, passing electrolyte to a cooling zone wherein another portion of the waste heat is abstracted without removal of water from the electrolyte and returning electrolyte after removal of reaction water and waste heat to said fuel cell.

2. Method of claim 1, wherein the gas is selected from the group consisting of one of the reaction gases of the fuel cell, a mixture of the reaction gases of the fuel cell and a gas compatible with the electrolyte.

3. Method according to claim 1, wherein the diaphragm is at least partly formed of hydrophobic material.

4. Method according to claim 1, wherein the condensation surface is at least partly of porous material forming a wall separating the water separating chamber from a coolant liquid, the pores of the material having a capillary pressure and the coolant liquid exerting a hydrostatic pressure, the pressure of the water vapor-bearing gas equilibrating the capillary pressure and the coolant hydrostatic pressure in the pores.

5. Method according to claim 1, wherein the pressure gas is one of the reaction gases of the fuel cell, and which includes maintaining the gas in the water separating chamber at the same pressure as the corresponding gas in the respective chamber thereof in the fuel cell.

6. Method according to claim 1, wherein the pressure gas is one of the reaction gases of the fuel cell, and which includes passing the one gas at reduced pressure from the fuel cell into the water separating chamber.

7. Apparatus for removing reaction water and waste heat from a fuel cell comprising an electrolyte circulatory flow system comprising a first electrolyte chamber within said fuel means a second electrolyte chamber with a water separation chamber, said second electrolyte chamber being outside said fuel cell, cooling means for cooling the electrolyte, said cooling means for cooling the electrolyte being outside said first and said second electrolyte chamber, transport means for transporting the electrolyte from said first electrolyte chamber within said fuel cell to said second electrolyte chamber and from said second electrolyte chamber back to said first electrolyte chamber within said fuel cell, and to said cooling means for cooling the electrolyte, diaphragm means separating said second electrolyte chamber from said water separation chamber, said diaphragm mens being in direct contact with the electrolyte and non-reactive with the electrolyte and being permeable to water vapor so that water vapor evaporating from the electrolyte diffuses through said diaphragm means, said water vapor bearing only part of the waste heat produced in the fuel cell, a condensation surface located in said water separation chamber for condensing said water vapor coming in contact therewith, cooling means for continuously cooling said condensation surface by a coolant flow, and means connected to said water separation chamber for discharging therefrom water condensed by said condensation surface.

8. Apparatus according to claim 7, wherein said second electrolyte chamber is defined by walls consisting of said diaphragm means.

9. Apparatus according to claim 7, wherein said second electrolyte chamber and said water separation chamber together conform to a fuel cell and are connected to an end fuel cell of a fuel cell battery.

10. Apparatus according to claim 7, wherein said second electrolyte chamber and said water separation chamber together conform to a fuel cell and are connected between at least two fuel cells.

11. Apparatus according to claim 7, including a source for supplying pressure gas to said water separation chamber, said source being connected to said water separation chamber through a protective valve.

12. Apparatus according to claim 7, including a source for supplying pressure gas to said water separation chamber, said source being one of the reaction gas chambers of the fuel cell.

13. Apparatus according to claim 7, wherein said condensation surface is non-porous, and said means for discharging water from said water separation chamber comprises a controllable valve, and including electrolyte concentration measuring means connected to said electrolyte circulatory flow system for operating said valve thus regulating the discharge of condensate water.

14. Apparatus according to claim 7, including electrolyte volume indicating means connected between said cooling means for cooling said condensation surface and said electrolyte circulatory flow system for controlling the flow of coolant in said cooling means for cooling said condensation surface.

15. Apparatus according to claim 7, including electrolyte concentration measuring means connected between said cooling means for cooling said condensation surface and said electrolyte circulatory flow system for regulating the flow of coolant in said cooling means for cooling said condensation surface.

16. Apparatus according to claim 7, including temperature sensing means in said electrolyte circulatory flow system connected to said cooling means for cooling said condensation surface for regulating the flow of coolant in said cooling means for cooling said condensation surface.

17. Apparatus according to claim 7, wherein said condensate water discharging means comprises an overflow vessel connected to said water separation chamber.

* * * * *